(12) United States Patent
Mizuno et al.

(10) Patent No.: US 8,794,090 B2
(45) Date of Patent: Aug. 5, 2014

(54) VEHICLE POWER UNIT

(75) Inventors: Kinya Mizuno, Wako (JP); Yoshiaki Tsukada, Wako (JP); Takashi Ozeki, Wako (JP); Kazuhiko Nakamura, Wako (JP); Mitsuo Nakagawa, Wako (JP); Yasushi Fujimoto, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 296 days.

(21) Appl. No.: 13/434,382

(22) Filed: Mar. 29, 2012

(65) Prior Publication Data

US 2012/0247238 A1 Oct. 4, 2012

(30) Foreign Application Priority Data

Mar. 31, 2011 (JP) ................................. 2011-077248

(51) Int. Cl.
*F16H 57/02* (2012.01)
(52) U.S. Cl.
USPC ...................... 74/333; 74/6; 74/331; 74/340
(58) Field of Classification Search
USPC .............................. 74/6, 331, 333, 337.5, 340
See application file for complete search history.

(56) References Cited

U.S. PATENT DOCUMENTS

| 7,866,227 | B2* | 1/2011 | Mizuno et al. | 74/331 |
| 8,307,730 | B2* | 11/2012 | Koyama et al. | 74/335 |
| 8,322,493 | B2* | 12/2012 | Mizuno et al. | 184/6.12 |
| 2010/0242870 | A1* | 9/2010 | Terada et al. | 123/54.4 |
| 2011/0061627 | A1* | 3/2011 | Terada et al. | 123/196 R |

FOREIGN PATENT DOCUMENTS

| EP | 2068030 A1 | 6/2009 |
| EP | 2182254 A1 | 5/2010 |
| JP | 2008-303939 A | 12/2008 |

* cited by examiner

*Primary Examiner* — William C Joyce
(74) *Attorney, Agent, or Firm* — Birch, Stewart, Kolasch & Birch, LLP

(57) ABSTRACT

In a vehicle power unit including a twin clutch type transmission that includes a pair of main shafts and clutches mounted on mutually different shafts, to enable compact shaft arrangements and to achieve a reduction in the size of the unit and the surrounding areas. Axial centers of a shift drum and a countershaft are disposed across a line that connects axial centers of main shafts in a side view as viewed from a direction of an axis of each of the main shafts and the countershaft.

20 Claims, 6 Drawing Sheets

VEHICLE POWER UNIT

CROSS-REFERENCE TO RELATED APPLICATIONS

The present application claims priority under 35 USC 119 to Japanese Patent Application No. 2011-077248 filed Mar. 31, 2011 the entire contents of which are hereby incorporated by reference.

FIELD OF THE INVENTION

The present invention relates to a vehicle power unit including a twin clutch type transmission that includes main shafts and clutches mounted on mutually different shafts.

DESCRIPTION OF BACKGROUND ART

A vehicle power unit is known that includes a twin clutch type transmission having a pair of main shafts disposed in parallel with each other, countershafts having axes that extend in parallel with the main shafts, gear trains of a plurality of shift speeds disposed between the main shafts and the countershafts, each of the gear trains being selectively established, and a clutch, disposed coaxially on each of the main shafts, for connecting and disconnecting power transmission from a crankshaft. See, for example, Japanese Patent Laid-open No. 2008-303939. This arrangement is more advantageous than in an arrangement in which a pair of clutches is disposed in tandem coaxially, in that an axial width of the power unit can be prevented from increasing.

The above-described known arrangement having a pair of main shafts and clutches mounted on mutually different shafts tends to require a greater space for disposing the shafts, as compared with the arrangement having main shafts and clutches on an identical axis. This poses a problem in that a vehicle body size is affected, if the power unit is applied to a compact vehicle (saddle riding type vehicle), such as a motorcycle.

SUMMARY AND OBJECTS OF THE INVENTION

An object of an embodiment of the present invention is to enable a compact shaft arrangement and to achieve a reduction in the size of the unit and the surrounding areas in a vehicle power unit including a twin clutch type transmission having main shafts and clutches mounted on mutually different shafts.

As means for solving the above-described problem, according to an embodiment of the present invention, a vehicle power unit (10) includes a crankshaft (21); first and second main shafts (31, 32) disposed in sequence from a side of the crankshaft (21); a countershaft (35) to be engaged at a time with either the first main shaft (31) or the second main shaft (32); a crankcase (14) for rotatably supporting the crankshaft (21), the first and second main shafts (31, 32) and the countershaft (35) such that the crankshaft (21), the first and second main shafts (31, 32) and the countershaft (35) extend in parallel with each other. First and second clutches (33, 34), respectively, are disposed on one end portion of a corresponding one of the first and second main shafts (31, 32) with the first and second clutches (33, 34) for individually connecting or disconnecting transmission of rotational power from the crankshaft (21) to the corresponding one of the first and second main shafts (31, 32). Gear trains with a plurality of shift speeds (36a, 36c, 36e, 37b, 37d, 37f), each being selectively established through rotation of a shift drum (52) are disposed between each of the first and second main shafts (31, 32) and the countershaft (35) and extend in parallel with each of the first and second main shafts (31, 32) and the countershaft (35). The power unit (10) changing the shift speeds through exchange of the first and second clutches (33, 34) and transmitting power to a drive wheel (11) from an end portion of the countershaft (35) protruding out of the crankcase (14). In the vehicle power unit (10), axial centers (C5, C6) of the shift drum (52) and the countershaft (35) are disposed across a line (SL) connecting axial centers (C3, C4) of the first and second main shafts (31, 32) in a side view as viewed from a direction of an axis of each of the first and second main shafts (31, 32) and the countershaft (35).

According to an embodiment of the present invention, in the side view as viewed from the direction of the axis of each of the first and second main shafts (31, 32) and the countershaft (35), the line (SL) is inclined upwardly toward a rear, the axial center (C6) of the shift drum (52) is disposed obliquely upwardly toward a front of the line (SL), and the axial center (C5) of the countershaft (35) is disposed obliquely downwardly toward the rear of the line (SL).

According to an embodiment of the present invention, in the side view as viewed from the direction of the axis of each of the first and second main shafts (31, 32) and the countershaft (35), the axial center (C5) of the countershaft (35) is disposed to be closer to the line (SL) than the axial center (C6) of the shift drum (52).

According to an embodiment of the present invention, in the side view as viewed from the direction of the axis of each of the first and second main shafts (31, 32) and the countershaft (35), the axial centers (C3, C4, C5) of the first and second main shafts (31, 32) and the countershaft (35) are equidistant from the axial center (C6) of the shift drum (52).

According to an embodiment of the present invention, in the side view as viewed from the direction of the axis of each of the first and second main shafts (31, 32) and the countershaft (35), the axial centers (C5, C6) of the countershaft (35) and the shift drum (52) are disposed on a perpendicular bisector (VSL) of the line (SL).

According to an embodiment of the present invention, the power unit further includes a starter motor (29) for starting, and the starter motor (29) is disposed forwardly of the crankshaft (21).

According to an embodiment of the present invention, the starter motor (29) is disposed downwardly of the crankshaft (21).

According to an embodiment of the present invention, the countershaft and the shift drum can be disposed in respective recessed spaces formed in a pair across the line between the main shafts parallely disposed each other. The transmission can therefore be compactly formed.

According to an embodiment of the present invention, the countershaft and the gear trains that are relatively heavy are disposed at low positions to achieve a low center of gravity of the entire unit. A drive mechanism for the shift drum can therefore be easily disposed in an empty space available above the crankcase. In addition, the main shaft and the clutch disposed in the rear portion of the unit are disposed at a high level. This allows the pivot shaft of the swing arm for supporting the drive wheel to be easily disposed at a lower side rearward of the crankcase. At the same time, the degree of freedom in disposing the countershaft as an output shaft and the pivot shaft can be enhanced.

According to an embodiment of the present invention, a downward bulge of the crankcase is restricted to thereby enhance the degree of freedom in disposing vehicle component parts.

According to an embodiment of the present invention, the shift drum, and the first and second main shafts and the countershaft are disposed in an integrated manner, so that a reduction in size of the transmission can be promoted. In addition, shift forks engaged with the shift drum and extending to a corresponding shaft can be disposed symmetrically relative to the perpendicular bisector, which contributes to reduction in cost through common use parts.

According to an embodiment of the present invention, a greater space for transmission layout can be easily obtained rearward of the crankshaft and good balance in weight of the power unit can be achieved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
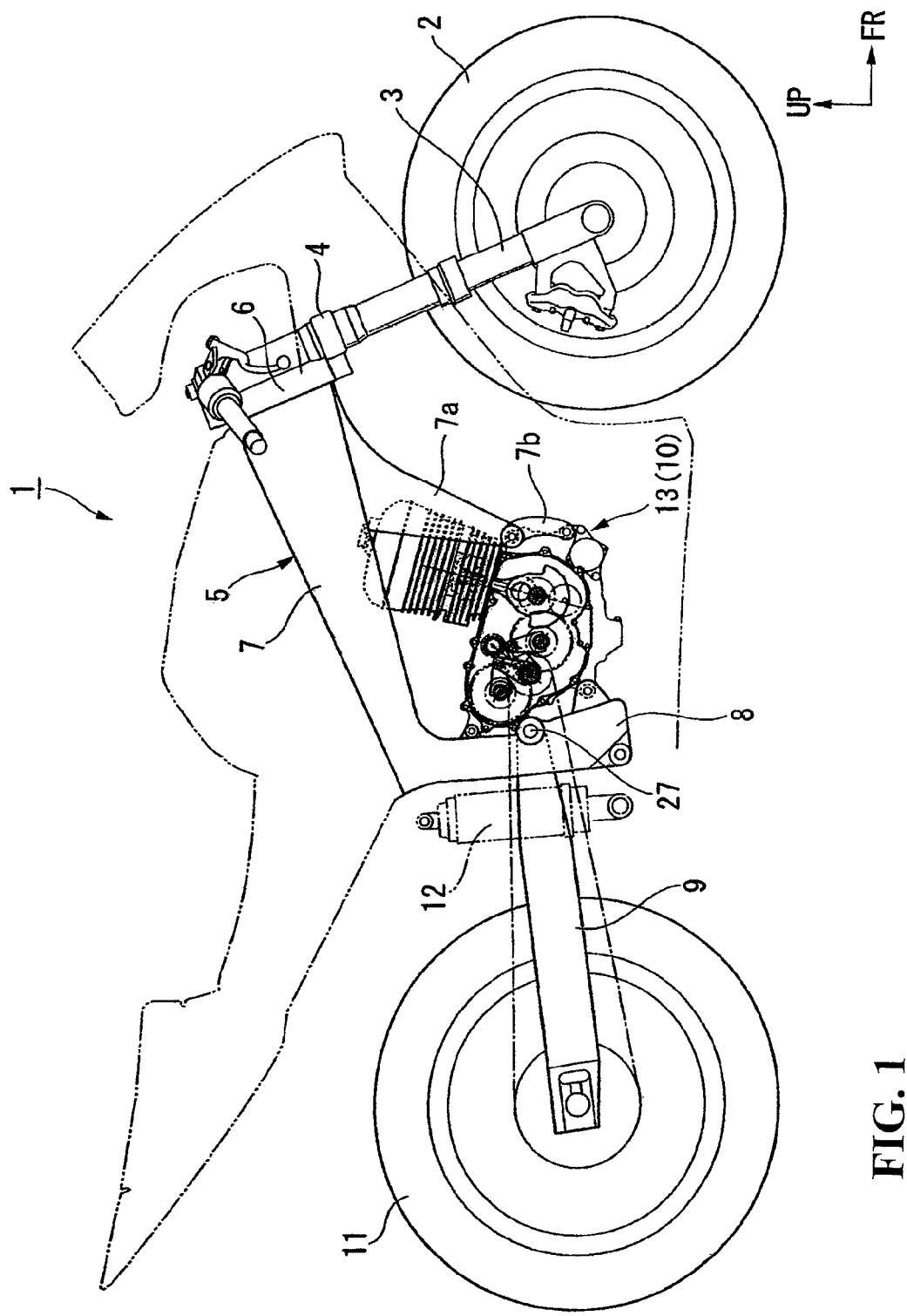
FIG. 1 is a right side elevational view showing a motorcycle according to an embodiment of the present invention.

A specific embodiment to which the present invention is applied will be described below with reference to the accompanying drawings. Throughout the descriptions given hereunder, expressions indicating directions including front and rear, and right and left, mean the same directions as those in a vehicle unless otherwise specified. In the drawings, an arrow FR indicates forward of the vehicle, an arrow LH indicates leftward of the vehicle, and an arrow UP indicates upward of the vehicle.

In a motorcycle (saddle riding type vehicle) 1 shown in FIG. 1, a front fork 3 that journals a front wheel 2 of the motorcycle 1 has an upper portion steerably pivoted by a head pipe 6 at a front end portion of a vehicle body frame 5 via a steering stem 4. A main frame 7 extends from the head pipe 6 obliquely downwardly toward the rear. A pivot frame 8 has an upper end portion connected to a rear end portion of the main frame 7. A swing arm 9 has a front end portion pivoted vertically swingably by a vertical middle portion of the pivot frame 8. A rear wheel 11 is journaled on a rear end portion of the swing arm 9. A shock absorber unit 12 is inserted between a front portion of the swing arm 9 and a rear portion of the vehicle body frame 5. In FIG. 1, a pivot shaft 27 is provided about which the swing arm 9 swings with a down frame 7a extending obliquely downwardly toward the rear from a lower end of a front portion of the main frame 7. A hanger bracket 7b is attached at a leading end portion of the down frame 7a.

A power unit 10 as a power engine of the motorcycle 1 is mounted on the vehicle body frame 5.

Figure 2:
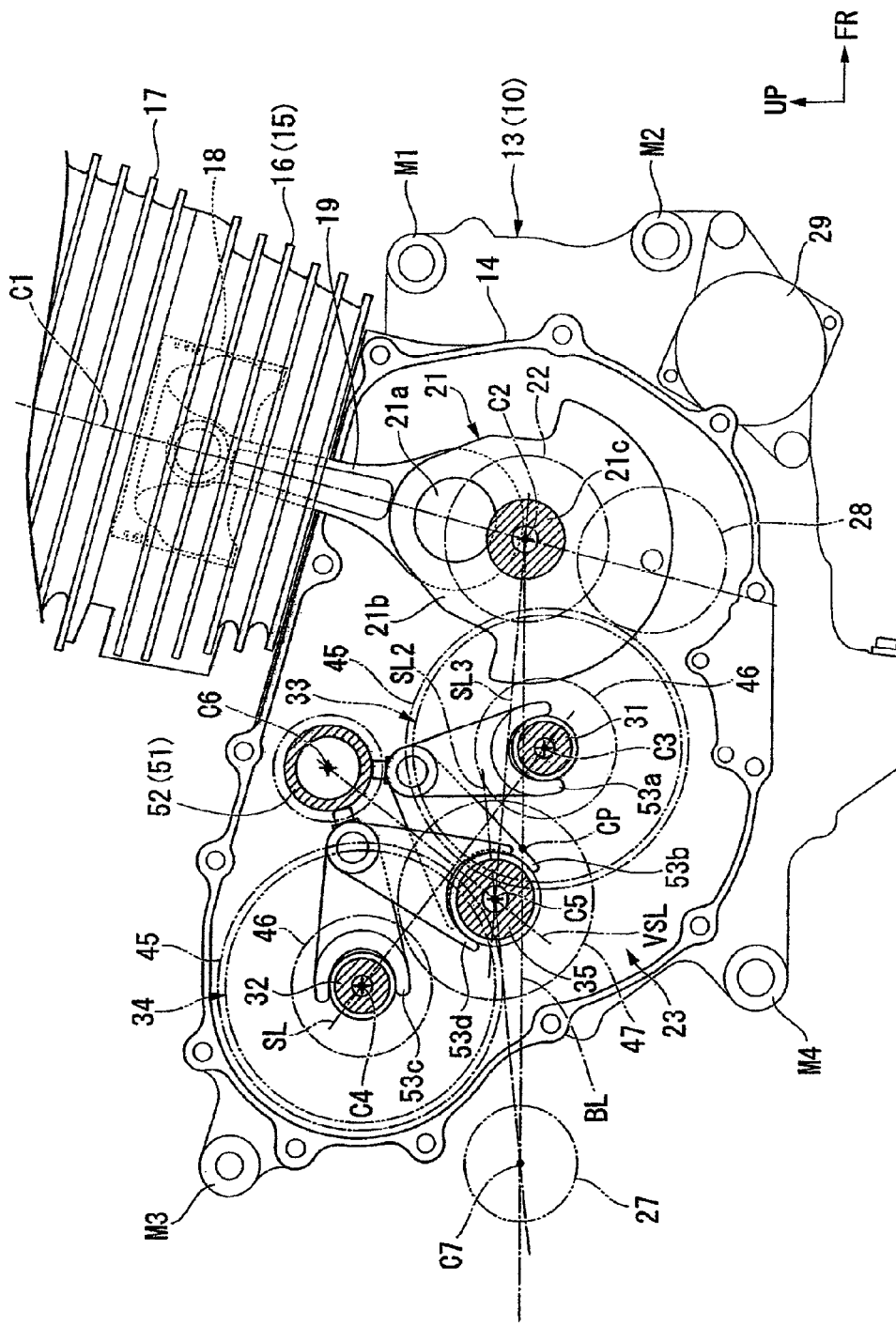
FIG. 2 is a right side elevational view showing a power unit of the motorcycle.

Referring also to FIG. 2, the power unit 10 integrally includes an air-cooled, single-cylinder engine (hereinafter referred to simply as the "engine") 13 that forms a front portion of the power unit 10 and a twin clutch type transmission (hereinafter referred to simply as the "transmission") 23 that is continuous rearwardly thereof.

The engine 13 has a basic configuration of a cylinder 15 mounted on a crankcase 14, standing upright in a position inclined forwardly relative to a vertical direction. In FIG. 2, a cylinder axis C1 extends in the standing direction of the cylinder 15. The crankcase 14 has upper and lower parts of a front end portion attached to lower end portions of the down frame 7a and the hanger bracket 7b, respectively, using, for example, bolts and upper and lower parts of a rear end portion attached to upper and lower parts of the pivot frame 8 using, for example, bolts. This results in the power unit 10 being fixedly supported by the vehicle body frame 5. In FIG. 2, front frame fixing portions M1 and M2 at the upper and lower parts of the front end portion of the crankcase 14 and reference numerals M3 and M4 denote rear frame fixing portions at the upper and lower parts of the rear end portion of the crankcase 14.

The cylinder 15 includes a cylinder main unit 16, a cylinder head 17, and a head cover 17a (see FIG. 5), in that order from the side of the crankcase 14. Intake system parts are connected to a rear portion (an intake side) of the cylinder head 17 and exhaust system parts are connected to a front portion (an exhaust side) of the cylinder head 17 (neither of them is shown).

A piston 18 reciprocates along the cylinder axis C1 and is fitted into the cylinder main unit 16. The reciprocating motion of the piston 18 is translated to a rotational motion of a crankshaft 21 via a connecting rod 19.

Figure 3:
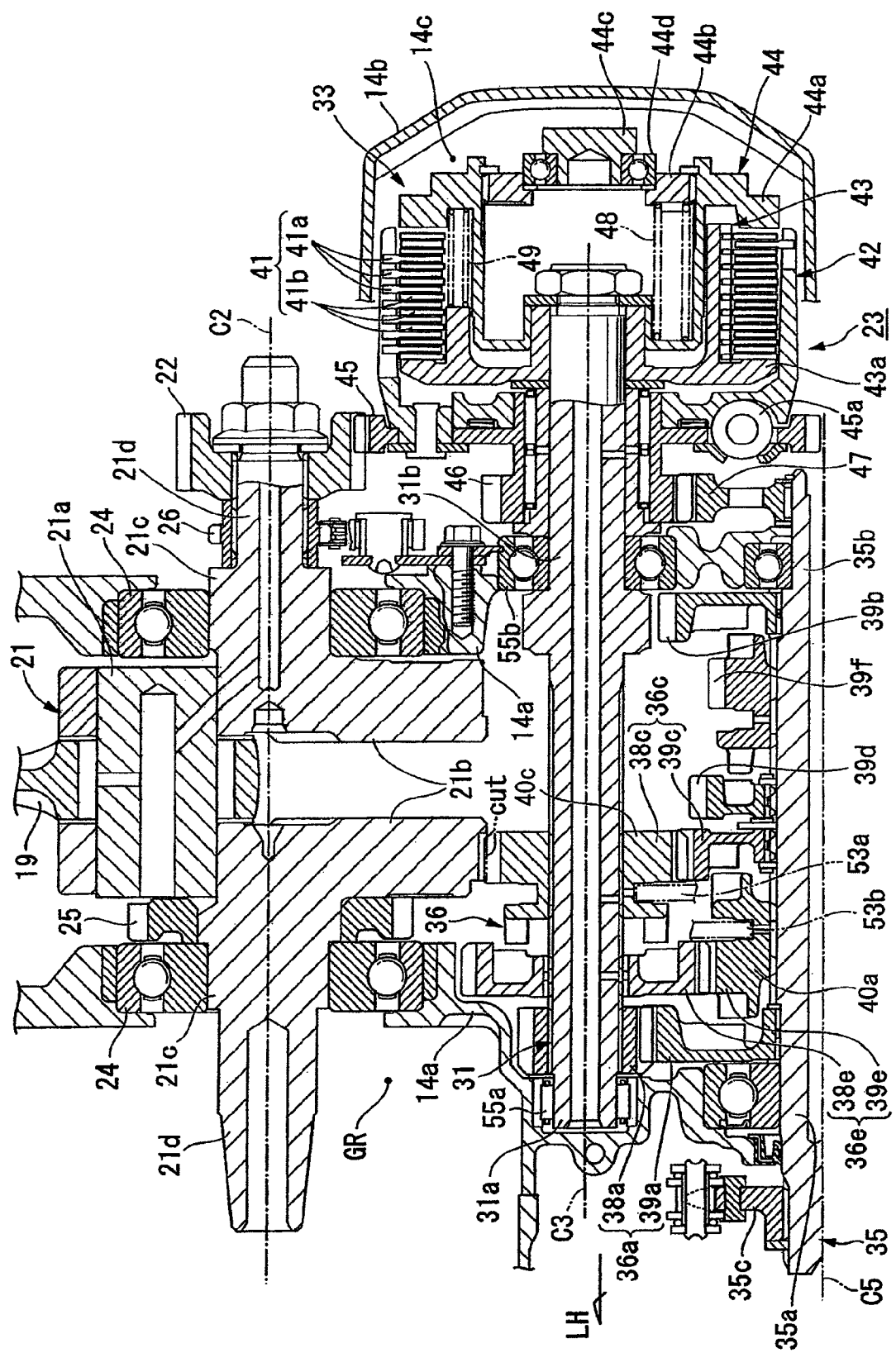
FIG. 3 is a cross-sectional view around a crankshaft and a first main shaft of the power unit, taking along a line extending in parallel with axes of the crankshaft and the first main shaft.

Referring to FIGS. 2 and 3, the crankshaft 21 includes a pair of left and right crank webs 21b, left and right journal portions 21c, and left and right support shafts 21d. More specifically, the crank webs 21b support a crankpin 21a. The journal portions 21c protrude outwardly to left and right from the crank webs 21b. The support shafts 21d extend further outwardly to left and right from the crank webs 21b. The left support shaft 21d supports integrally rotatably a rotor of an alternator not shown. The right support shaft 21d supports integrally rotatably a primary drive gear 22 for transmitting power to the transmission 23.

Referring to FIG. 3, a rotational central axis C2 (crank axis) extends laterally in the crankshaft 21 (left and right journal portions 21c) with left and right radial ball bearings 24 being provided that rotatably support the left and right journal portions 21c on left and right side wall portions 14a of the crankcase 14. An oil pump drive gear 25 is supported integrally rotatably with, and between, the left crank web 21b and the left journal portion 21c. A cam drive sprocket 26 is supported integrally rotatably with, and between, the right journal portion 21c and the primary drive gear 22.

In addition, referring to FIG. 2, the pivot shaft 27 extends laterally for supporting a front end portion of the swing arm 9. A swing central axis C7 (pivot axis) extends laterally in the pivot shaft 27. An an oil pump 28 is disposed downwardly of the crankshaft 21 in the crankcase 14 with a starter motor 29 being disposed on a lower side of a front end portion of the crankcase 14.

Referring to FIG. 2, the transmission 23 and a change mechanism 51 are housed in a rear portion of the crankcase 14. More specifically, the transmission 23 is disposed in a power transmission path between the engine 13 and a drive wheel. The change mechanism 51 changes a shift speed of the transmission 23. Rotational power of the crankshaft 21 is output to the left side in the rear portion of the crankcase 14 via the transmission 23 and then transmitted to the rear wheel 11 via, for example, a chain drive mechanism.

Figure 4:
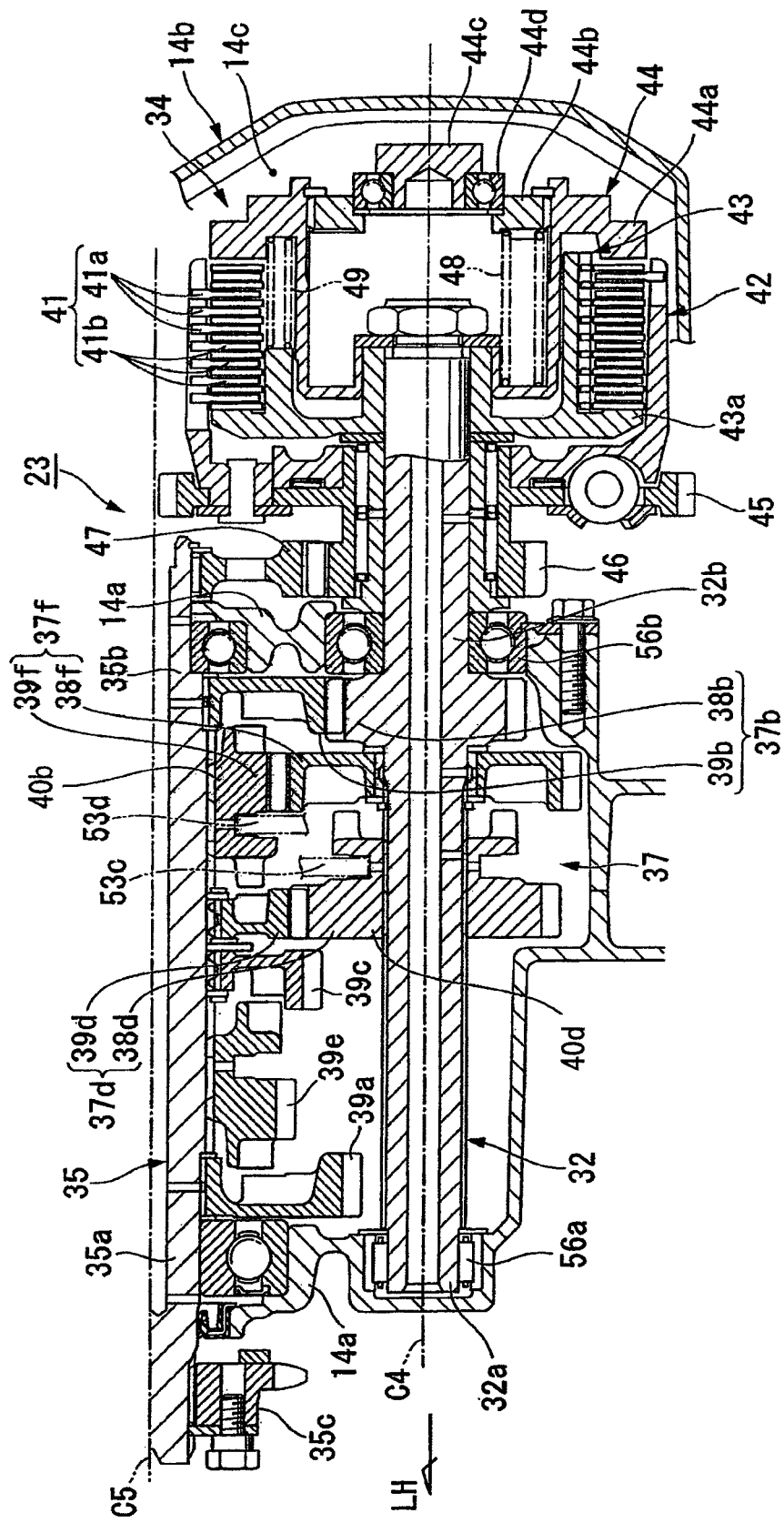
FIG. 4 is a cross-sectional view around a second main shaft of the power unit, taking along a line extending in parallel with an axis of the second main shaft.

Referring to FIGS. 3 and 4, the transmission 23 includes first and second main shafts 31 and 32, first and second clutches 33 and 34, a countershaft 35, a first change gear group 36, and a second change gear group 37. More specifically, the first and second main shafts 31 and 32 each form an independent shaft extending laterally in parallel with each other. The first and second clutches 33 and 34 are coaxially supported at right end portions of the first and second main shafts 31 and 32, respectively. The countershaft 35 forms an independent shaft extending laterally in parallel with each of the first and second main shafts 31 and 32. The first change gear group 36 is disposed across the first main shaft 31 and the countershaft 35. The second change gear group 37 is disposed across the second main shaft 32 and the countershaft 35. The first change gear group 36 includes a plurality of gear trains (gear pairs) for odd-numbered shift speeds. The second change gear group 37 includes a plurality of gear trains (gear pairs) for even-numbered shift speeds. In FIG. 2, rotational central axes C3, C4 and C5 (a first main axis, a second main axis, a counter axis) extend laterally in the first and second main shafts 31 and 32 and the countershaft 35, respectively.

The transmission 23 is capable of power transmission by selectively using any of the gear trains. In normal operations with a constant shift speed, the transmission 23 connects one of the first and second clutches 33 and 34 and disconnects the other of the first and second clutches 33 and 34, and transmits power using any of the gear trains connected to the clutch in the connected state. The transmission 23 creates a condition of being capable of power transmission using a gear train previously selected from among the gear trains connected to the clutch in the disconnected state. From this condition, the transmission 23 disconnects the clutch in the connected state and connects the clutch in the disconnected state (exchanges the first and second clutches 33 and 34) to thereby change the shift speeds between the odd-numbered shift speeds and the even-numbered shift speeds.

Referring to FIGS. 3 and 4, each of the first and second clutches 33 and 34 is a wet type multiple disc clutch including a plurality of clutch plates 41 that are alternately overlapping in an axial direction thereof. Each of the first and second clutches 33 and 34 is housed in the right side portion of the crankcase 14 (inside a clutch compartment 14c). As illustrated in the FIGS. 3 and 4, a clutch cover 14b is provided for covering the clutch compartment 14c.

Figure 5:
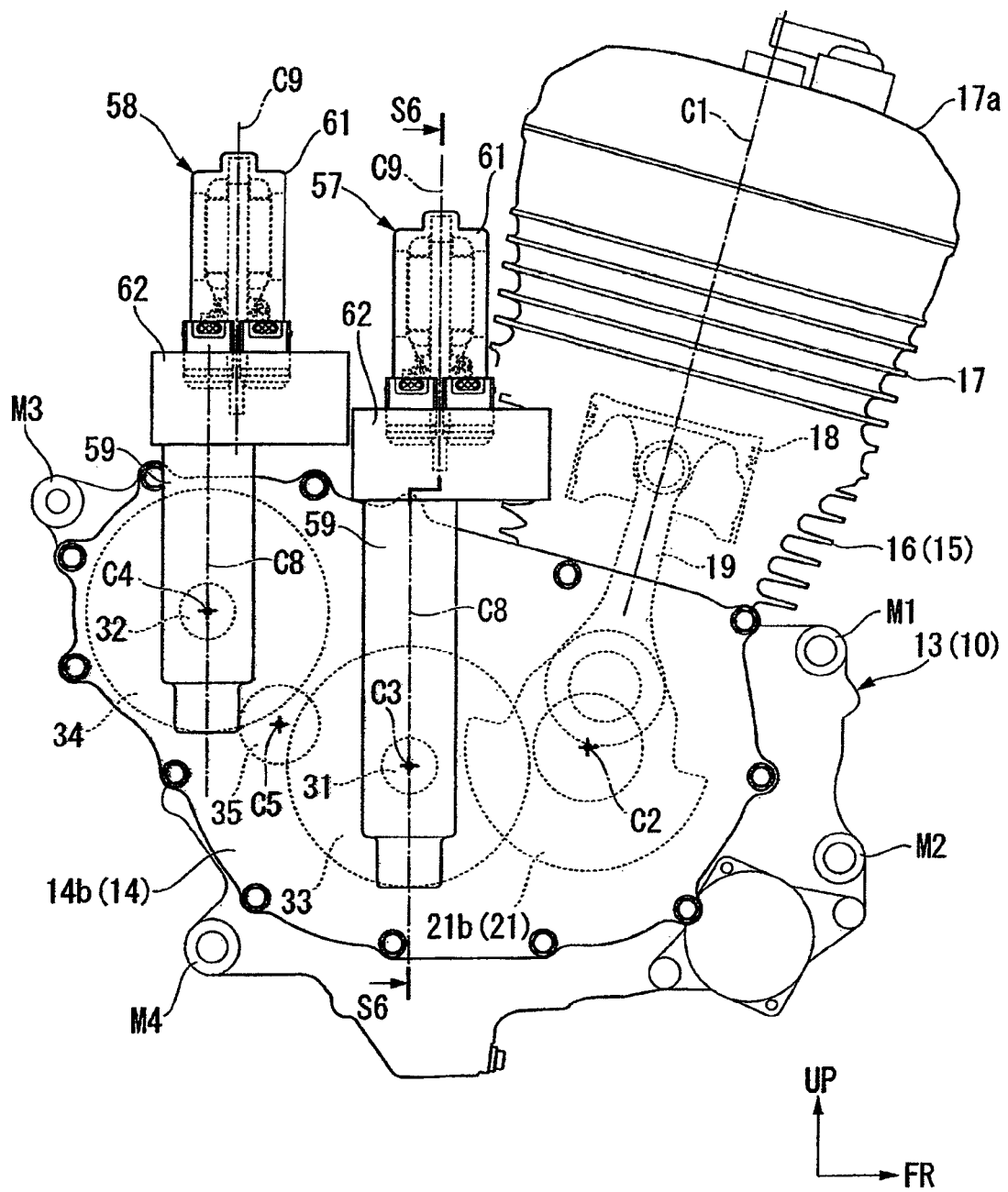
FIG. 5 is a right side elevational view showing the power unit including a clutch actuator.
Figure 6:
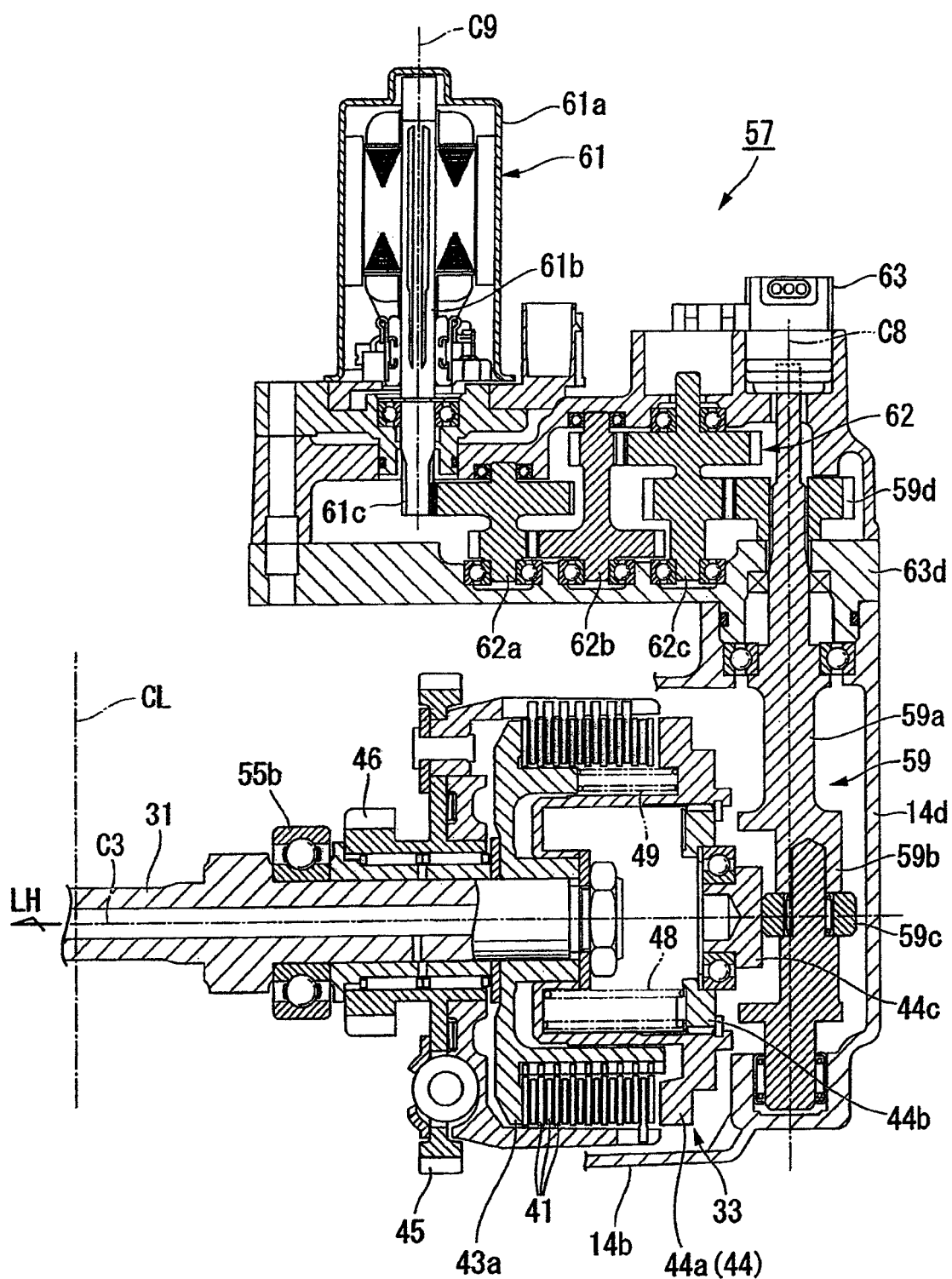
FIG. 6 is a cross-sectional view taken along line S6-S6 of FIG. 5.

Each of the first and second clutches 33 and 34 is a mechanical type, in which each of the clutch plates 41 is brought into friction engagement by pressure received from each of clutch actuators 57 and 58 (see FIGS. 5 and 6). For convenience sake, the clutch actuators 57 and 58 are omitted in FIGS. 3 and 4.

Each of the first and second clutches 33 and 34 is disposed so as not to overlap each other in a side view. A lateral width of the power unit 10 is thereby restrained (see FIG. 2). Each of the first and second clutches 33 and 34 is disposed so as to circumvent the journal portion 21c of the crankshaft 21 and the pivot shaft 27 in a side view. Each of the first and second clutches 33 and 34 is disposed at a position as high as feasible to suppress the splashing of engine oil.

The second clutch 31 disposed in the rear portion of the crankcase 14 is disposed so as to be displaced considerably upwardly relative to the countershaft 35 and such that a front end portion thereof is disposed forwardly of the axis C5 of the countershaft 35, in order to allow the pivot shaft 27 to be disposed obliquely downwardly toward the rear of the second clutch 34 and to limit the longitudinal length of the entire unit. A section in the rear portion of the crankcase 14 for accommodating the second clutch 34 bulges with the second clutch 34 at a position upward of the pivot shaft 27.

The first clutch 33 has a rear portion overlapping with a front portion of the second clutch 34 in the longitudinal direction, and the first clutch 33 has an upper portion overlapping with a lower portion of the second clutch 34 in the vertical direction.

In addition, the second clutch 34 has a rear portion overlapping with a front portion of the pivot shaft 27 in the longitudinal direction, and the second clutch 34 has the lower portion overlapping with an upper portion of the pivot shaft 27 in the vertical direction.

The transmission 23 is a constant-mesh type in which a drive gear and a driven gear associated with each shift speed are in constant mesh with each other. Gears are broadly classified into a free gear that is capable of relative rotation about a shaft on which the gear is supported and a slide gear that is splined to the shaft. The operation of the change mechanism 51 axially moves the slide gear, which establishes power transmission using a gear train corresponding to any of the shift speeds.

Referring to FIG. 2, the first main shaft 31 is disposed such that the axis C3 thereof is positioned rearwardly and slightly downwardly of the crank axis C2. More specifically, the first main axis C3 is disposed, in a side view, downwardly of an approximately horizontal reference straight line BL connecting the crank axis C2 and the pivot axis C7, and close to the reference straight line BL such that an upper end portion of the first main shaft 31 crosses the reference straight line BL.

The second main shaft 32 is disposed such that the axis C4 thereof is positioned obliquely upwardly toward the rear of the first main axis C3 and obliquely upwardly toward the front of the pivot axis C7. More specifically, the second main axis C4 is disposed, in a side view, at a height upward of the reference straight line BL and such that an outline of the second clutch 34 is spaced away from the reference straight line BL.

The countershaft 35 is disposed such that the axis C5 thereof is positioned rearwardly and slightly upwardly of the first main axis C3. More specifically, the counter axis C5 is disposed, in a side view, upwardly of the reference straight line BL and close to the reference straight line BL such that a lower end portion of the countershaft 35 crosses the reference straight line BL.

The counter axis C5 is disposed so as to be positioned, in a side view, downwardly of a rearwardly upward inclined line SL connecting the first main axis C3 and the second main axis C4 in a direction orthogonal to the inclined line SL. The first main shaft 31, the countershaft 35, and the second main shaft 32 are disposed in sequence rearwardly relative to, and upwardly at greater distances from, the crankshaft 21. In FIG.

2, an inclined orthogonal line VSL passes through the counter axis C5 and is orthogonal to the inclined line SL in a side view. The inclined orthogonal line VSL corresponds to a perpendicular bisector of the inclined line SL.

The second main shaft 32 and the second clutch 34, spaced rearwardly away from the crankshaft 21 to be thereby disposed in the rear portion of the crankcase 14, are disposed at a relatively high position as described above. This arrangement allows the pivot shaft 27 to be disposed at a vertical position equivalent to that of the crankshaft 21 and at a lower position rearward of the crankcase 14. The arrangement also allows the pivot shaft 27 to be as forwardly as possible (on the side of the crankshaft 21) (more specifically, an axis distance between the pivot shaft 27 and the crankshaft 21 can be shortened).

It is here noted that, relative to a rearwardly downward second inclined line SL2 connecting the pivot axis C7 and the counter axis C5, the first main axis C3 is disposed downwardly and the second main axis C4 is disposed upwardly in a side view. Similarly, relative to a rearwardly upward third inclined line SL3 connecting the crank axis C2 and the counter axis C5, the first main axis C3 is disposed downwardly and the second main axis C4 is disposed upwardly in a side view.

A shift drum 52 of the change mechanism 51 is disposed upwardly of the first main shaft 31 and forwardly of the second main shaft 32.

The change mechanism 51 includes the shift drum 52 and four shift forks 53a to 53d. More specifically, the shift drum 52 is a hollow cylinder extending in parallel with each of the first and second main shafts 31 and 32 and the countershaft 35. The four shift forks 53a to 53d engage with respective four lead grooves (not shown) formed in an outer periphery of the shift drum 52. Rotation of the shift drum 52 causes each of the shift forks 53a to 53d to move individually axially according to a pattern of a corresponding lead groove, which individually moves axially a corresponding one of shifters 40a to 40d to be described later of the transmission 23. This selects gears to be used for power transmission between either one of the first and second main shafts 31 and 32 and the countershaft 35 in the transmission 23 (or, power transmission elements are established).

In FIG. 2, a rotational central axis C6 (drum axis) extends laterally in the shift drum 52. The drum axis C6 is disposed so as to be positioned upwardly of the inclined line SL in an orthogonal direction thereof in a side view. The drum axis C6, together with the counter axis C5, is disposed on the inclined orthogonal line VSL in the side view. The drum axis C6 is spaced further away from the inclined line SL than the counter axis C5. The shift forks 53a to 53d are arranged substantially symmetrically with respect to the inclined orthogonal line VSL in the side view.

Referring to FIG. 3, the first main shaft 31 has a left end portion rotatably supported on the left side wall portion 14a of the crankcase 14 via a left radial needle bearing 55a and a right end portion rotatably supported on the right side wall portion 14a of the crankcase 14 via a right radial ball bearing 55b. The first clutch 33 is coaxially supported at a portion of the first main shaft 31 extended to the right of the right radial ball bearing 55b.

Referring to FIG. 4, the second main shaft 32 has a left end portion rotatably supported on the left side wall portion 14a of the crankcase 14 via a left radial needle bearing 56a and a right end portion rotatably supported on the right side wall portion 14a of the crankcase 14 via a right radial ball bearing 56b. The second clutch 34 is coaxially supported at a portion of the second main shaft 32 extending to the right of the right radial ball bearing 56b.

Referring to FIG. 3, the first clutch 33 includes a clutch outer 42, a clutch inner 43, the plurality of clutch plates 41, and a pressure unit 44. More specifically, the clutch outer 42 is a closed-bottom cylinder that is coaxial with, and relatively rotatably supported by, the first main shaft 31 to transmit rotational power at all times with the crankshaft 21. The clutch inner 43 also has a closed-bottom cylindrical shape and is disposed on an inner peripheral side of the clutch outer 42. The clutch inner 43 is integrally rotatably supported on the first main shaft 31. The clutch plates 41 are stacked axially in a space defined by cylindrical walls of the clutch outer 42 and the clutch inner 43. The pressure unit 44, disposed coaxially on an open side of the clutch inner 43, presses the stacked clutch plates 41 (hereinafter may be referred to as a clutch plate group 41) to the left.

A large-diameter power transmission gear (primary driven gear) 45 is attached to the left side of a bottom wall of the clutch outer 42 via a damper 45a. The large-diameter power transmission gear 45 is larger in diameter than the bottom wall. The primary drive gear 22 disposed on the right end portion of the crankshaft 21 meshes with the large-diameter power transmission gear 45. A small-diameter power transmission gear 46 having a relatively small diameter is integrally formed to the left of the large-diameter power transmission gear 45 on an inner peripheral side thereof. An idle gear 47 rotatably supported on the right end portion of the countershaft 35 meshes with the small-diameter power transmission gear 46. The large-diameter power transmission gear 45 of the second clutch 34 to be described later also meshes with the idle gear 47.

Clutch discs 41a that are supported by the clutch outer 42 in the clutch plates 41 are supported integrally rotatably and axially movably on an inner peripheral side of the cylindrical wall of the clutch outer 42. Clutch plates 41b that are supported by the clutch inner 43 in the clutch plates 41 are supported integrally rotatably and axially movably on an outer peripheral side of the cylindrical wall of the clutch inner 43. A left pressure flange 43a is integrally formed on the outer periphery of the bottom wall of the clutch inner 43. The left pressure flange 43a is adjacent on the left of a left side surface of the clutch plate group 41.

A right pressure flange 44a of the pressure unit 44 is adjacent on the right of a right side surface of the clutch plate group 41. The right pressure flange 44a moves to the left through the operation of the clutch actuators 57 and 58 to be described later. As a result, the clutch plate group 41 is clamped and integrally brought into frictional engagement between the left pressure flange 43a and the right pressure flange 44a, so that a clutch connected state is established in which torque transmission is enabled between the clutch outer 42 and the clutch inner 43. When the right pressure flange 44a moves to the right, the frictional engagement is released to thereby establish a clutch disconnected state in which the torque transmission is disabled.

The pressure unit 44 includes the right pressure flange 44a, a pressure ring 44b, and a pressure cap 44c. More specifically, the right pressure flange 44a is integrally rotatable with the clutch inner 43. The pressure ring 44b is disposed on an inner periphery of a right end portion of the right pressure flange 44a and is capable of pressing the right pressure flange 44a to the left via a clutch spring 48. The pressure cap 44c is engaged relatively rotatably with an inner periphery of the pressure ring 44b via a radial ball bearing 44d and capable of pressing the pressure ring 44b to the left.

A rotational shaft 59a (camshaft) of the clutch actuators 57 and 58 to be described later is disposed to the right of the pressure cap 44c. The rotational shaft 59a presses the pressure cap 44c, the pressure ring 44b, and the right pressure flange 44a to the left, which brings the clutch plate group 41 into frictional engagement. When the pressure is released, a return spring 49 disposed between the right pressure flange 44a and the clutch inner 43 acts to move the right pressure flange 44a to the right, which releases the frictional engagement.

The second clutch 34 has identical arrangements as those of the first clutch 33 (see FIG. 4). Like or corresponding parts are identified by the same reference numerals as those used for the first clutch 33 and detailed descriptions for those parts will be omitted.

Referring to FIGS. 2 to 4, for the clutch outer 42 of the first clutch 33, the rotational power from the primary drive gear 22 (crankshaft 21) is applied to the large-diameter power transmission gear 45.

The clutch outer 42 of the second clutch 34 receives an input of rotational power of the crankshaft 21, as transmitted via the primary drive gear 22, the large-diameter power transmission gear 45 of the first clutch 33, the small-diameter power transmission gear 46 of the first clutch 33, the idle gear 47, the small-diameter power transmission gear 46 of the second clutch 34, and the large-diameter power transmission gear 45 of the second clutch 34 in that order.

The first change gear group 36 and the second change gear group 37 forms a total of six shift speeds.

The first change gear group 36 forms first-speed, third-speed, and fifth-speed gear trains 36a, 36c and 36e corresponding to odd-numbered shift speeds (first, third, and fifth speeds) and is disposed across a right side portion of the first main shaft 31 and a right side portion of the countershaft 35.

The second change gear group 37 forms second-speed, fourth-speed, and sixth-speed gear trains 37b, 37d and 37f corresponding to even-numbered shift speeds (second, fourth, and sixth speeds) and is disposed across a left side portion of the second main shaft 32 and a left side portion of the countershaft 35.

Singly establishing any gear train of the first and second change gear groups 36 and 37 allows the rotational power of the crankshaft 21 applied to either one of the first and second main shafts 31 and 32 to be transmitted to the countershaft 35 after reduction at a predetermined reduction ratio.

The first-speed gear train 36a includes a first-speed drive gear 38a and a first-speed driven gear 39a. More specifically, the first-speed drive gear 38a is adjacent on the right of the left end portion of the first main shaft 31 (a left journal portion 31a supported by the crankcase 14) and supported integrally rotatably on the first main shaft 31. The first-speed driven gear 39a is adjacent on the right of the left end portion of the countershaft 35 (a left journal portion 35a supported by the crankcase 14) and supported relatively rotatably on the countershaft 35.

The right end portion of the first main shaft 31 forms a right journal portion 31b supported by the crankcase 14 and protrudes into the clutch compartment 14c on the right side of the crankcase 14. The first clutch 33 is mounted on this protrusion.

The left end portion of the countershaft 35 (left journal portion 35a) protrudes out of the crankcase 14. A drive section (drive sprocket in the FIGS. 3 and 4) 35c of the drive mechanism is mounted on this protrusion.

A first shifter 40a that is integrally rotatable with, and axially movable along, the countershaft 35 adjoins the first-speed driven gear 39a to the right. The first shifter 40a moves axially to thereby be engaged integrally rotatably with the first-speed driven gear 39a. This allows the rotational power of the crankshaft 21 applied to the first main shaft 31 to be transmitted to the countershaft 35 after a speed reduction through the first-speed gear train 36a.

The second-speed gear train 37b includes a second-speed drive gear 38b and a second-speed driven gear 39b. More specifically, the second-speed drive gear 38b is adjacent on the left of the right end portion of the second main shaft 32 (a right journal portion 32b supported by the crankcase 14) and formed, for example, integrally with the second main shaft 32. The second-speed driven gear 39b is adjacent on the left of the right end portion of the countershaft 35 (a right journal portion 35b supported by the crankcase 14) and supported relatively rotatably on the countershaft 35.

The right end portion (right journal portion 32b) of the second main shaft 32 protrudes into the clutch compartment 14c. The second clutch 34 is mounted on this protrusion.

The right end portion of the countershaft 35 (right journal portion 35b) protrudes into the clutch compartment 14c. The idle gear 47 is relatively rotatably supported on this protrusion.

The left end portion of the second main shaft 32 forms a left journal portion 32a supported by the crankcase 14.

A second shifter 40b that is integrally rotatable with, and axially movable along, the countershaft 35 adjoins the second-speed driven gear 39b to the left. The second shifter 40b moves axially to thereby be engaged integrally rotatably with the second-speed driven gear 39b. This allows the rotational power of the crankshaft 21 applied to the second main shaft 32 to be transmitted to the countershaft 35 after a speed reduction through the second-speed gear train 37b.

The third-speed gear train 36c includes a third-speed drive gear 38c and a third-speed driven gear 39c. More specifically, the third-speed drive gear 38c is supported integrally rotatably on the first main shaft 31 more on the left of a lateral middle portion of a section between the left and right journal portions 31a and 31b (gear support portion). The third-speed driven gear 39c is supported relatively rotatably on the countershaft 35 more on the left of a lateral middle portion of a section between the left and right journal portions 35a and 35b (gear support portion).

The third-speed drive gear 38c is integrally formed on the right of an outer periphery of a third shifter 40c that is integrally rotatably and axially movably supported on the first main shaft 31.

The first shifter 40a adjoins the third-speed driven gear 39c to the left. The first shifter 40a moves axially to thereby be engaged integrally rotatably with the third-speed driven gear 39c. This allows the rotational power of the crankshaft 21 applied to the first main shaft 31 to be transmitted to the countershaft 35 after a speed reduction through the third-speed gear train 36c.

The third-speed drive gear 38c is disposed at a laterally identical position with the left crank web 21b. The left crank web 21b has a cutout cut formed on an outermost peripheral position thereof to thereby circumvent the third-speed drive gear 38c (see FIG. 3). This allows the first main shaft 31 to be as close as possible to the crankshaft 21.

The fourth-speed gear train 37d includes a fourth-speed drive gear 38d and a fourth-speed driven gear 39d. More specifically, the fourth-speed drive gear 38d is supported integrally rotatably on the second main shaft 32 more on the right of a lateral middle portion of a section between the left and right journal portions 32a, 32b (gear support portion). The fourth-speed driven gear 39d is supported relatively rotatably on the countershaft 35 more on the right of the lateral middle portion of the gear support portion.

The fourth-speed drive gear 38d is integrally formed on the left side of an outer periphery of a fourth shifter 40d that is integrally rotatably and axially movably supported on the second main shaft 32.

The second shifter 40b adjoins the fourth-speed driven gear 39d to the right. The second shifter 40b moves axially to thereby be engaged integrally rotatably with the fourth-speed driven gear 39d. This allows the rotational power of the crankshaft 21 applied to the second main shaft 32 to be transmitted to the countershaft 35 after a speed reduction through the fourth-speed gear train 37d.

The fifth-speed gear train 36e includes a fifth-speed drive gear 38e and a fifth-speed driven gear 39e. More specifically, the fifth-speed drive gear 38e adjoins the first-speed drive gear 38a to the right and is relatively rotatably supported on the first main shaft 31. The fifth-speed driven gear 39e adjoins the first-speed driven gear 39a to the right and is integrally rotatably supported on the countershaft 35.

The fifth-speed driven gear 39e is integrally formed on the left side of the outer periphery of the first shifter 40a.

The third shifter 40c adjoins the fifth-speed drive gear 38e to the right. The third shifter 40c moves axially to thereby be engaged integrally rotatably with the fifth-speed drive gear 38e. This allows the rotational power of the crankshaft 21 applied to the first main shaft 31 to be transmitted to the countershaft 35 after a speed reduction through the fifth-speed gear train 36e.

Of the gears in the first change gear group 36 supported on the first main shaft 31, the fifth-speed drive gear 38e has the largest diameter and is disposed at an identical lateral position with the left crank bearing 24. An outer peripheral side of the left crank bearing 24 is smaller in diameter than a generator compartment GR to the left thereof and the crank web 21b to the right thereof. The relatively large-diameter fifth-speed drive gear 38e, being disposed on the outer peripheral side of the left crank bearing 24, allows the first main shaft 31 to be disposed close to the crankshaft 21.

The sixth-speed gear train 37f includes a sixth-speed drive gear 38f and a sixth-speed driven gear 39f. More specifically, the sixth-speed drive gear 38f adjoins the second-speed drive gear 38b to the left and is relatively rotatably supported on the second main shaft 32. The sixth-speed driven gear 39f adjoins the second-speed driven gear 39b to the left and is integrally rotatably on the countershaft 35.

The sixth-speed driven gear 39f is integrally formed on the right side of the outer periphery of the second shifter 40b.

The fourth shifter 40d adjoins the sixth-speed drive gear 38f to the left. The fourth shifter 40d moves axially to thereby be engaged integrally rotatably with the sixth-speed drive gear 38f. This allows the rotational power of the crankshaft 21 applied to the second main shaft 32 to be transmitted to the countershaft 35 after a speed reduction through the sixth-speed gear train 37f.

The drive gears 38a to 38f have diameters decreasing in order of the first speed to the sixth speed and the driven gears 39a to 39f have diameters increasing in order of the first speed to the sixth speed.

More specifically, the second-speed drive gear 38b is smaller in diameter than the first-speed drive gear 38a, the fourth-speed drive gear 38d is smaller in diameter than the third-speed drive gear 38c, and the sixth-speed drive gear 38f is smaller in diameter than the fifth-speed drive gear 38e.

Similarly, the second-speed driven gear 39b is larger in diameter than the first-speed driven gear 39a, the fourth-speed driven gear 39d is larger in diameter than the third-speed driven gear 39c, and the sixth-speed driven gear 39f is larger in diameter than the fifth-speed driven gear 39e.

From the foregoing, the odd-numbered speed drive gears 38a, 38c and 38e are generally smaller in diameter than the even-numbered speed drive gears 38b, 38d and 38f.

The arrangement in which the odd-numbered speed drive gears 38a, 38c and 38e are supported by the first main shaft 31 that is disposed close to the crankshaft 21 allows the first main shaft 31 and even the transmission 23 to be disposed as close as possible to the crankshaft 21, which promotes a reduction in the size of the power unit 10, as compared with an arrangement in which the even-numbered speed drive gears 38b, 38d and 38f are supported by the first main shaft 31.

The shift drum 52 in the change mechanism 51 is rotatably supported on the inside of the upper portion of the crankcase 14 (at a position upward of the first main shaft 31 and forward of the second main shaft 32). The first to fourth shift forks 53a to 53d have proximal end portions engaged with respective lead grooves formed in the outer periphery of the shift drum 52.

Each of the first to fourth shift forks 53a to 53d has a distal end side spreading out wide. Each of these distal end portions of the first to fourth shift forks 53a to 53d engages with a corresponding one of the first to fourth shifters 40a to 40d. Each of the first to fourth shift forks 53a to 53d and each the first to fourth shifters 40a to 40d are axially moved according to the pattern of the corresponding lead groove by rotation of the shift drum 52, which singly establishes any of the gear trains.

An ECU (not shown) as a control unit of the transmission 23 controls the operation of each of the first and second clutches 33 and 34 and the shift drum 52 based on detected information by various types of sensors, thereby changing the shift speed (shift position) of the transmission 23.

More specifically, the transmission 23 sets only either one of the first and second clutches 33 and 34 into the connected state and uses any of the change gear trains associated with the clutch in the connected state to transmit power. The transmission 23 selects in advance a change gear train to be next established, as selected from among the change gear trains associated with the other of the first and second clutches 33 and 34. Under this condition, the transmission 23 simultaneously disconnects the one clutch and connects the other clutch to thereby establish power transmission using the previously selected change gear train. An upshift or downshift of the transmission 23 is thus performed.

In the transmission 23, while the motorcycle 1 is stationary after the engine is started, the first and second clutches 33 and 34 are kept in the disconnected state and, in preparation for starting the motorcycle 1, a first-speed state is set in which a first-speed gear (a starting gear, the first-speed gear train 36a) is established from a neutral state in which power transmission using any of the change gear trains is disabled. From this condition, for example, an engine speed is increased, so that the first clutch 33 is set into the connected state by way of partial clutch engagement, which starts the motorcycle 1.

While the motorcycle 1 is running, while keeping only the one clutch associated with a current shift position in a connected state, the transmission 23 establishes in advance, based on, for example, vehicle operating information, a change gear train associated with a next shift position as selected from among any change gear trains connected to the other clutch in the disconnected state.

More specifically, if the current shift position is an odd-numbered speed (or an even-numbered speed), then the next shift position is an even-numbered speed (or an odd-numbered speed), so that the rotational power of the crankshaft 21 is applied to the first main shaft 31 (or the second main shaft 32) via the first clutch 33 (or the second clutch 34) in the connected state. At this time, the second clutch 34 (or the first clutch 33) is in the disconnected state, so that the rotational power of the crankshaft 21 is not applied to the second main shaft 32 (or the first main shaft 31).

When the ECU thereafter determines that shift timing has arrived, power transmission using the change gear train associated with the previously established next shift position is effected by a simple operation performed by the transmission 23 to disconnect the first clutch 33 (or the second clutch 34) in the connected state and connect the second clutch 34 (or the first clutch 33) in the disconnected state. This enables a quick and smooth gearshift involving no time lag or power transmission interruption during the gearshift.

Referring to FIGS. 5 and 6, the first and second clutch actuators 57 and 58 each include a pressing mechanism 59 disposed on the right outer surface of the crankcase 14. The pressing mechanism 59 applies a pressing force (engaging force) individually to the first clutch 33 or the second clutch 34. It is to be noted that FIG. 6 shows the first clutch actuator 57 corresponding to the first clutch 33. The second clutch actuator 58 corresponding to the second clutch 34 has the same arrangements as those of the first clutch actuator 57.

Each of the clutch actuators 57 and 58 includes the pressing mechanism 59, an electric motor 61, and a reduction gear mechanism 62. More specifically, the pressing mechanism 59 includes the rotational shaft 59a disposed so as to extend perpendicularly to the first main axis C3 and in the vertical direction. The electric motor 61, disposed in parallel with the rotational shaft 59a, gives rotational power to the rotational shaft 59a. The reduction gear mechanism 62 connects the rotational shaft 59a and the electric motor 61. In FIG. 5, a rotational central axis C8 extends in a direction in which the rotational shaft 59a extends and a drive central axis C9 extends in parallel with the rotational central axis C8 in the electric motor 61.

The rotational shaft 59a of the pressing mechanism 59 is rotatably supported in a cylindrical mechanism accommodating portion 14d that is formed integrally with a clutch cover 14b. The rotational shaft 59a includes an eccentric shaft 59b and an eccentric roller 59c. More specifically, the eccentric shaft 59b is disposed at a portion at which the eccentric shaft 59b crosses the first main axis C3. The eccentric roller 59c is coaxially supported on the eccentric shaft 59b. The eccentric roller 59c has an outer peripheral surface abutted on the right end surface of the pressure cap 44c of the first clutch 33. When the eccentric shaft 59b and the eccentric roller 59c are displaced to the right, the clutch plates 41 are not clamped to thereby establish the clutch disconnected state. When the eccentric shaft 59b and the eccentric roller 59c are displaced to the left, the clutch plates 41 are clamped to thereby establish the clutch connected state.

The electric motor 61 includes a motor main unit 61a and a drive shaft 61b. The drive shaft 61b has a leading end portion protruding downwardly from the motor main unit 61a. A pinion gear 61c is formed at the leading end portion of the drive shaft 61b. The pinion gear 61c is disposed at a height substantially equal to a height of a driven gear 59d mounted coaxially at an upper end portion of the rotational shaft 59a.

The reduction gear mechanism 62 connecting between the pinion gear 61c and the driven gear 59d rotatably supports, in a casing 62d, three reduction gear shafts 62a to 62c that integrally form large and small spur wheels. The reduction gear mechanism 62 and the electric motor 61 are disposed so as to bulge upwardly of the crankcase 14 at a position rearward of the cylinder 15. In FIG. 6, a rotation sensor 63 (clutch connection/disconnection sensor) is disposed coaxially with, and upwardly of, the eccentric shaft 59b and a lateral centerline CL of the power unit 10 and the motorcycle 1.

As described heretofore, the vehicle power unit 10 according to the embodiment of the present invention includes the crankshaft 21 with the first and second main shafts 31 and 32 disposed in sequence from the side of the crankshaft 21 and the single countershaft 35 engaged at a time with either the first main shaft 31 or the second main shaft 32. The crankcase 14 rotatably supports the crankshaft 21, the first and second main shafts 31 and 32 and the countershaft 35 such that the crankshaft 21, the first and second main shafts 31 and 32 and the countershaft 35 extend in parallel with each other. The first and second clutches 33 and 34 are disposed on one end portion of a corresponding one of the first and second main shafts 31 and 32 with the first and second clutches 33 and 34 for individually connecting or disconnecting transmission of rotational power from the crankshaft 21 to the corresponding one of the first and second main shafts 31 and 32. The gear trains of a plurality of shift speeds 36a, 36c, 36e, 37b, 37d and 37f are each selectively established through rotation of the shift drum 52 disposed between each of the first and second main shafts 31 and 32 and the countershaft 35 and extend in parallel with each of the first and second main shafts 31 and 32 and the countershaft 35. The power unit 10 changes the shift speeds through an exchange of the first and second clutches 33 and 34.

In the vehicle power unit 10, axial centers (drum axis C6, counter axis C5) of the shift drum 52 and the countershaft 35 are disposed across the line (inclined line SL) connecting axial centers (first and second main axes C3 and C4) of the first and second main shafts 31 and 32 in a side view as viewed from the direction of the axis of each of the first and second main shafts 31 and 32 and the countershaft 35.

The foregoing arrangements allow the countershaft 35 and the shift drum 52 to be disposed in respective recessed spaces formed in a pair across the line between the first and second main shafts 31 and 32. The transmission 23 can therefore be compactly formed.

In the side view as viewed from the direction of the axis of each of the first and second main shafts 31 and 32 and the countershaft 35, the line (inclined line SL) is inclined upwardly toward the rear, the drum axis C6 of the shift drum 52 is disposed obliquely upwardly toward the front of the line, and the counter axis C5 of the countershaft 35 is disposed obliquely downwardly toward the rear of the line. The countershaft 35 and the gear trains that are relatively heavy are disposed at low positions to achieve a low center of gravity of the entire power unit 10. A drive mechanism for the shift drum 52 can therefore be easily disposed in an empty space available above the crankcase 14.

In the side view as viewed from the direction of the axis of each of the first and second main shafts 31 and 32 and the countershaft 35, the axial center (counter axis C5) of the countershaft 35 is disposed to be closer to the line (inclined line SL) than the axial center (drum axis C6) of the shift drum 52 in the power unit 10. A downward bulge of the crankcase 14 is thus restricted to thereby enhance the degree of freedom in disposing vehicle component parts.

The present invention is not limited to the above-described embodiment. For example, the engine of the power unit includes reciprocating engines of various types, such as not only the air-cooled, single-cylinder engine, but also a water-cooled engine, a parallel or V-type multi-cylinder engine, and a longitudinal engine having a crankshaft extending in a vehicle longitudinal direction.

The saddle riding type vehicle includes general types of vehicles in which the rider straddles the vehicle body, including not only the motorcycle (including a scooter type vehicle), but also a three-wheeled (including a vehicle having two front wheels and one rear wheel as well as a vehicle having one front wheel and two rear wheels) or four-wheeled vehicle.

The arrangements of the above-described embodiment are only typical and the present invention encompasses various changes falling within the spirit and scope of the invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle power unit comprising:
   a crankshaft;
   first and second main shafts disposed in sequence from a side of the crankshaft;
   a countershaft to be engaged at a time with either the first main shaft or the second main shaft;
   a crankcase for rotatably supporting the crankshaft, the first and second main shafts and the countershaft such that the crankshaft, the first and second main shafts and the countershaft extend in parallel with each other;
   first and second clutches disposed on one end portion of a corresponding one of the first and second main shafts, the first and second clutches individually connecting or disconnecting transmission of rotational power from the crankshaft to the corresponding one of the first and second main shafts; and
   gear trains of a plurality of shift speeds, each being selectively established through rotation of a shift drum disposed between each of the first and second main shafts and the countershaft and extending in parallel with each of the first and second main shafts and the countershaft, the power unit changing the shift speeds through an exchange of the first and second clutches and transmitting power to a drive wheel from an end portion of the countershaft protruding out of the crankcase;
   wherein axial centers of the shift drum and the countershaft are disposed across a line connecting axial centers of the first and second main shafts in a side view as viewed from a direction of an axis of each of the first and second main shafts and the countershaft.

2. The vehicle power unit according to claim 1, wherein in the side view as viewed from the direction of the axis of each of the first and second main shafts and the countershaft, the line is inclined upwardly toward a rear, the axial center of the shift drum is disposed obliquely upwardly toward a front of the line, and the axial center of the countershaft is disposed obliquely downwardly toward the rear of the line.

3. The vehicle power unit according to claim 2, wherein in the side view as viewed from the direction of the axis of each of the first and second main shafts and the countershaft, the axial center of the countershaft is disposed to be closer to the line than the axial center of the shift drum.

4. The vehicle power unit according to claim 2, wherein in the side view as viewed from the direction of the axis of each of the first and second main shafts and the countershaft, the axial centers of the first and second main shafts and the countershaft are equidistant from the axial center of the shift drum.

5. The vehicle power unit according to claim 2, wherein in the side view as viewed from the direction of the axis of each of the first and second main shafts and the countershaft, the axial centers of the countershaft and the shift drum are disposed on a perpendicular bisector of the line.

6. The vehicle power unit according to claim 2, further comprising:
   a starter motor for starting, wherein the starter motor is disposed forwardly of the crankshaft.

7. The vehicle power unit according to claim 1, wherein in the side view as viewed from the direction of the axis of each of the first and second main shafts and the countershaft, the axial center of the countershaft is disposed to be closer to the line than the axial center of the shift drum.

8. The vehicle power unit according to claim 7, wherein in the side view as viewed from the direction of the axis of each of the first and second main shafts and the countershaft, the axial centers of the first and second main shafts and the countershaft are equidistant from the axial center of the shift drum.

9. The vehicle power unit according to claim 7, wherein in the side view as viewed from the direction of the axis of each of the first and second main shafts and the countershaft, the axial centers of the countershaft and the shift drum are disposed on a perpendicular bisector of the line.

10. The vehicle power unit according to claim 7, further comprising:
    a starter motor for starting, wherein the starter motor is disposed forwardly of the crankshaft.

11. The vehicle power unit according to claim 1, wherein in the side view as viewed from the direction of the axis of each of the first and second main shafts and the countershaft, the axial centers of the first and second main shafts and the countershaft are equidistant from the axial center of the shift drum.

12. The vehicle power unit according to claim 1, wherein in the side view as viewed from the direction of the axis of each of the first and second main shafts and the countershaft, the axial centers of the countershaft and the shift drum are disposed on a perpendicular bisector of the line.

13. The vehicle power unit according to claim 1, further comprising:
    a starter motor for starting, wherein the starter motor is disposed forwardly of the crankshaft.

14. The vehicle power unit according to claim 13, wherein the starter motor is disposed downwardly of the crankshaft.

15. A vehicle power unit comprising:
    a crankshaft;
    a first main shaft disposed on one side of the crankshaft;
    a second main shaft disposed on the one side of the crankshaft and being disposed adjacent to the first main shaft;
    a countershaft operatively positioned on the one side of the crankshaft and being disposed between the first main shaft and the second main shaft, said countershaft being selectively engaged at a time with either the first main shaft or the second main shaft;
    said crankshaft, the first and second main shafts and the countershaft extend in parallel with each other;
    first and second clutches disposed on one end portion of a corresponding one of the first and second main shafts, the first and second clutches individually connecting or disconnecting transmission of rotational power from the crankshaft to the corresponding one of the first and second main shafts; and
    gear trains of a plurality of shift speeds, each being selectively established through rotation of a shift drum disposed between each of the first and second main shafts and the countershaft and extending in parallel with each of the first and second main shafts and the countershaft, the power unit changing the shift speeds through an exchange of the first and second clutches;

wherein axial centers of the shift drum and the countershaft are disposed across a line connecting axial centers of the first and second main shafts in a side view as viewed from a direction of an axis of each of the first and second main shafts and the countershaft.

16. The vehicle power unit according to claim 15, wherein in the side view as viewed from the direction of the axis of each of the first and second main shafts and the countershaft, the line is inclined upwardly toward a rear, the axial center of the shift drum is disposed obliquely upwardly toward a front of the line, and the axial center of the countershaft is disposed obliquely downwardly toward the rear of the line.

17. The vehicle power unit according to claim 16, wherein in the side view as viewed from the direction of the axis of each of the first and second main shafts and the countershaft, the axial center of the countershaft is disposed to be closer to the line than the axial center of the shift drum.

18. The vehicle power unit according to claim 16, wherein in the side view as viewed from the direction of the axis of each of the first and second main shafts and the countershaft, the axial centers of the first and second main shafts and the countershaft are equidistant from the axial center of the shift drum.

19. The vehicle power unit according to claim 15, wherein in the side view as viewed from the direction of the axis of each of the first and second main shafts and the countershaft, the axial center of the countershaft is disposed to be closer to the line than the axial center of the shift drum.

20. The vehicle power unit according to claim 15, wherein in the side view as viewed from the direction of the axis of each of the first and second main shafts and the countershaft, the axial centers of the first and second main shafts and the countershaft are equidistant from the axial center of the shift drum.

* * * * *